Jan. 19, 1937.                F. C. BIGGERT, JR                 2,068,260
                               CLUTCH MECHANISM
                              Filed Jan. 12, 1935              2 Sheets-Sheet 1
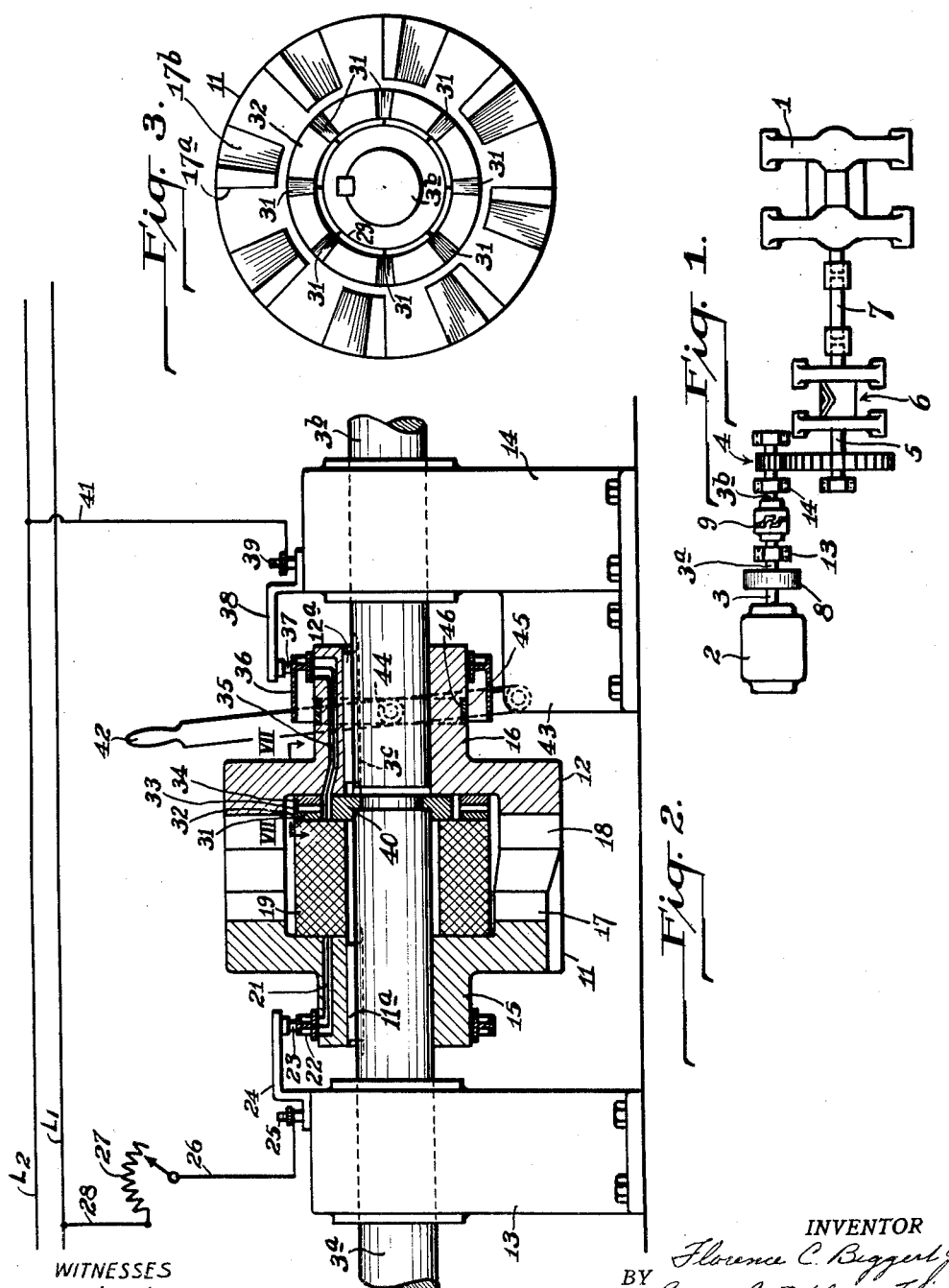
INVENTOR
Florence C. Biggert Jr
BY Brown, Critchlow & Flick
his ATTORNEY
WITNESSES
A B Wallace
J E Dickinson

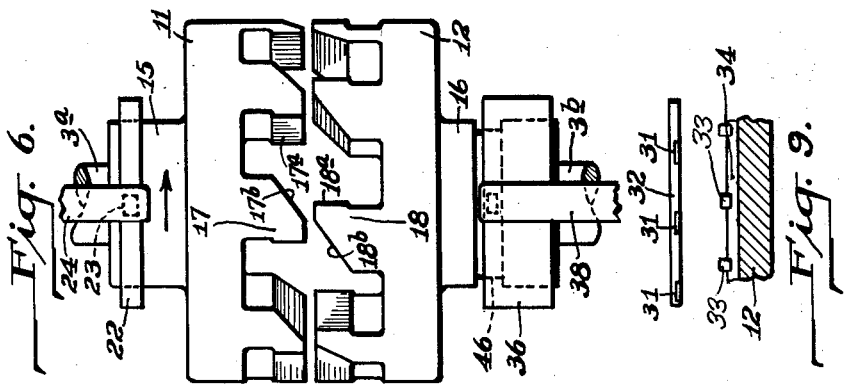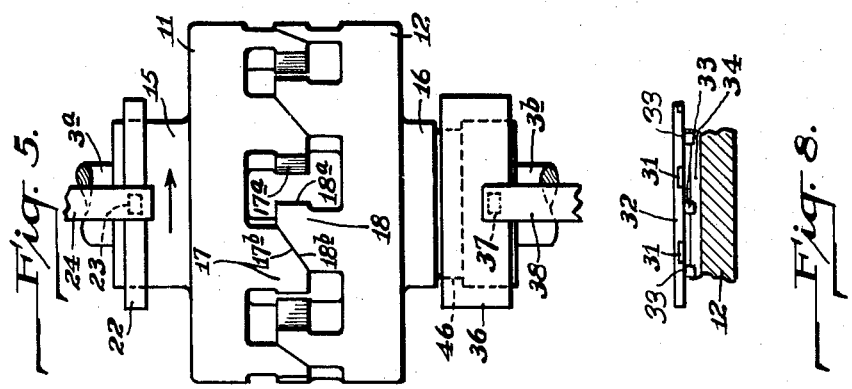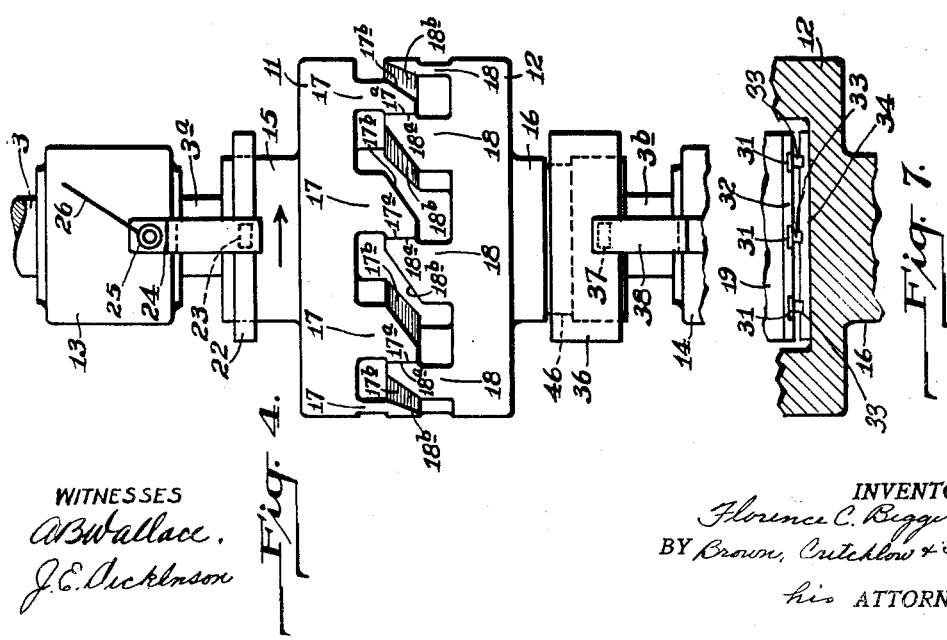

Patented Jan. 19, 1937

2,068,260

UNITED STATES PATENT OFFICE 2,068,260

CLUTCH MECHANISM

Florence C. Biggert, Jr., Crafton, Pa., assignor to United Engineering & Foundry Company, Pittsburgh, Pa., a corporation of Pennsylvania Application January 12, 1935, Serial No. 1,467

17 Claims. (Cl. 192—56)

This invention relates to an automatically operable clutch mechanism which is adapted for use in a power supplying drive shaft and to automatically disconnect the power supply from the device being driven thereby in the event the load on the driven element exceeds a predetermined limit, and although it may be used in various arrangements it will now be described in connection with a metal rolling mill drive for use in which it has been more particularly developed.

In their operation, as is well known, rolling mills frequently become so overloaded because of the material being rolled becoming jammed in the rolls or for numerous other reasons that unless the driving forces therefor are quickly disconnected, the driving element or the driving connection between the driving element and the mill is either seriously damaged or destroyed.

With this in mind, it is an object of this invention to provide an automatically operable overload releasing mechanism for use in a rolling mill drive or the like which is adapted to be readily inserted in the driving shaft connection between the mill and its operating motor.

Another object is to provide a clutch mechanism of this character which in addition to being rapid and dependable in operation is adapted to be quickly reconnected after each releasing operation.

A further object is to provide an overload release clutch of this type which is operated magnetically and is capable of being operated an unlimited number of times without injury.

A further object is to provide an overload releasing mechanism which may be readily adjusted to respond to loads of different intensities.

These and various other objects as well as the various other novel features and advantages of the invention will be apparent when the following detailed description is read in conjunction with the accompanying drawings of which Fig. 1 is a schematic view of a rolling mill layout illustrating a clutch of the type contemplated by the invention and showing it arranged in the drive shaft connected to the mill motor; Fig. 2 a detailed view partly in section of a clutch constituting one embodiment of the invention; Fig. 3 an elevational view looking into the face of the clutch head shown on the left-hand side of Fig. 2; Figs. 4, 5, and 6 plan views of the clutch illustrated in Figs. 2 and 3 showing the clutch heads thereof engaged, partially disengaged and completely disengaged, respectively; and Figs. 7, 8, and 9 sectional views taken on the line VII—VII of Fig. 2 and showing the relative positions of the current-conducting brushes and collector segments located in the clutch heads for controlling the energization and deenergization of the clutch magnet when the clutch heads are in the relative positions shown in Figs. 4, 5, and 6.

Referring in detail to the drawings and first more particularly to Fig. 1, the numeral 1 designates a rolling mill and the numeral 2 its driving motor. To this motor there is connected a drive shaft 3 equipped with a fly-wheel 8 to assist it, for a well-known purpose, in driving the mill, which is connected to a gear-reducing unit 4 that is in turn connected by a second drive shaft 5 to a pinion stand 6, the pinions of which are connected by flexibly coupled shafts 7 to the mill rolls.

As illustrated the shaft 3, which is connected to the motor, is divided into two parts 3a and 3b and the abutting ends thereof releasably coupled together by an overload release clutch 9, which is constructed in accordance with this invention and located between the fly-wheel 8 and the gear-reducing unit 4 so that the forces tending to drive the mill are disconnected whenever the clutch is released.

Referring now more particularly to the remaining figures of the drawings, the embodiment of the invention therein illustrated comprises a pair of clutch heads 11 and 12, the former of which is rigidly keyed by a key 11a to the shaft 3a and the latter by a key 12a movable in a keyway 3c for axial adjustment on the shaft 3b. To accurately support these clutch heads 11 and 12 and the abutting ends of the shaft parts 3a and 3b in axial alignment, suitable bearing supports 13 and 14 through which the shafts are projected are provided.

The clutch heads 11 and 12, as shown, are of substantially the same shape, being formed in the fashion of a cylinder and provided on their outer ends with hubs 15 and 16 for securing them to the shafts 3a and 3b, respectively, and on their abutting extremities with a series of peripherally spaced axially projecting teeth-like clutch elements 17 and 18. The purpose of these latter clutch elements 17 and 18 is to provide a series of magnetically operable armatures for releasably holding the clutch heads together and a series of cams for separating the clutch heads when the clutch is released as will presently appear.

In accordance with what is now considered to be the preferred form of the invention, although as will be readily appreciated they may be considerably varied in shape, the teeth 17 and 18 which are disposed in opposed relation on the two heads are provided on their one side with armature faces 17a and 18a lying in planes passing through the axes of the shafts 3a and 3b, and on the other side with inclined faces 17b and 18b which function as cams for separating the clutch heads when the speed of the driven head 12 falls below that of the driving head 11.

The centers of the abutting ends of the clutch heads 11 and 12 as illustrated are both hollowed out, and in the fixed head 11 there is mounted an electromagnet coil 19 which substantially fills the cavity in both heads. To support this coil and provide it with a permeable core to reduce the reluctance of the magnetic circuit in which it operates the end of the shaft 3a is projected through it to a point approximately opposite the inner face of the slidable head 12 when in its operative position, and to energize and control it, one of its ends 21 is connected to a collector ring 22 mounted on but insulated from the hub 15 of the clutch head 17. A brush 23 mounted in a brush holder 24 secured to the adjacent bearing support 13 in which the shaft 3a is mounted is arranged to contact this collector ring 22, and a terminal 25 is provided on this brush holder to receive one end of a conductor 26 which is connected at its other end to the adjustable contact of a variable resistor 27. This resistor is utilized to vary the field strength of the coil 19 to thereby control the pull-out value of the clutch, and is connected by a conductor 28 to one side L1 of the source of current supply L1, L2 employed to energize the clutch.

The other end 29 of the electromagnet coil 19 is connected in parallel (see Fig. 3) to a plurality of peripherally spaced conductor segments 31 mounted in a commutator-type switch element 32 made of insulating material and securely mounted at the outer end of the coil 19. These conductor segments 31 as also shown in Fig. 3 are equal in number to the number of armature faces 17a on the clutch head 11 and cooperate with an equal number of similarly spaced brushes 33 mounted in a suitable insulating support 34 secured to the inner wall of the clutch head 12. These latter brushes 33 like the segments 31 are connected in parallel to a conductor 35 which is in turn connected to a collector ring 36 mounted on but insulated from the hub 16 of the clutch head 12. A brush 37 secured to a brush holder 38 mounted on the bearing support 14 for the shaft 3b is arranged to engage this collector ring 36, and a conductor 41 extending from line conductor L2 is attached to a terminal 39 mounted on this holder 38 to complete the control circuit for the electromagnet coil 19.

To insure the energization of the brushes 33 at all times the collector ring 36 mounted on the movable clutch head 12 is made sufficiently wide to prevent the brush 37 associated therewith from moving out of contact with it when the clutch head is moved from one position to another, and the conductor segments 31 on the commutator 32 and the brushes 33 in the head 12 are so spaced and so proportioned as to control the energization and deenergization of the electromagnetic coil 19 in the manner and for the purpose hereinafter described.

To place the clutch in its operative position the motor 2 is operated to move the driving clutch head 11 into a position relative to the adjustable head 12 such as shown in Fig. 4, and the adjustable or driven head is then moved into its operative position, its forward movement being determined by a collar 40 mounted on the end of the shaft 3a or by the keyway 3c. For conveniently so moving this head 12 on the shaft 3b, a lever 42 is provided, being pivotally secured at its lower end to a boss 43 affixed to the bearing support 14 and connected intermediate its ends by a trunnion 44 to a collar 45 loosely mounted in a groove 46 provided for its reception in the hub 16 of the movable head 12.

As previously inferred, the conductor segments 31 on the commutator 32 and the brushes 33 on the switch element 34 in the adjustable clutch head 12 are so shaped and positioned that when the latter head is moved to its operative position the energizing circuit for the electromagnet coil 19 is completed and a magnetic field established. The magnetic circuit for this field is traced through the shaft 3a disposed within the magnet 19, the body proper of fixed clutch head 11, the teeth-like projections 17 of that head, out through their armature faces 17a and into the teeth 18 of the adjustable head 12 by way of the armature faces 18a, thence through the body proper of the adjustable clutch head 12, and the collar 40, back to the shaft 3a, all of which are made of permeable material.

Once the electromagnet 19 is energized in the manner described the clutch heads 11 and 12 are held together by the magnetic forces existing between the armature faces 17a and 18a, and as previously referred to these may be varied by varying the amount of current supplied to the magnetic coil 19 through the use of the variable resistor 27, or some similar means, a number of which are known to the art. Consequently, in operation the clutch will be maintained in operative engagement once it is energized, so long as the resistance to turning encountered by the driven clutch head 12 is less than the magnetic pull between the armature faces 17a and 18a on it and the head 11. On the other hand, as soon as the force required to turn the mill exceeds the pull-out value of the clutch the driving clutch head 11 will pull away from the driven head 12, and in doing so will cause the conductor segments 31 to move out of contact with the brushes 33, shortly after the armature faces separate. This, of course, breaks the magnetic circuit and releases the clutch heads and also prevents any possibility of the clutch heads being drawn together when not in their proper clutching relation. Immediately after the heads are drawn apart the cams 17b on the driving head 11 move into engagement with the cams 18b on the driven head 12 and thereby because of the shape of these cams force the latter head backwards on the shaft 3b out of engagement with the driving head. This, as will be obvious, permits the driving motor, the fly-wheel 8, and the driving clutch head 11 to continue freely in operation and relieves the driving connection and the mill of all driving strains of an injurious character.

Hence, as will be readily appreciated, the driving power for the mill will in this way be quickly released in the event of an overload, and the mill and drive effectively protected, and, in addition, as will also be readily appreciated, the clutch may be easily and quickly reconnected to the mill with a minimum of effort and loss of time. In accordance with the invention the clutch can be readily adjusted to pull out at various values of load through the use of the adjustable resistor in the magnetic circuit and there is practically no limit to the number of times it can be operated without injury to itself.

According to the provisions of the patent statutes, I have explained the principle and mode of operation of my invention, and have illustrated and described what I now consider to be its best embodiments. However, I desire to have it understood that, within the scope of the appended claims, the invention may be practiced otherwise than as specifically illustrated and described.

I claim:

1. An overload release clutch comprising a pair of rotary clutch elements, an electromagnet carried by one of said elements, and cooperating means on said elements for holding them against relative rotary movement solely by the magnetic forces exerted thereon by said magnet, and characterized by said elements being adapted to rotate relative to each other when the pull-out load of the clutch is exceeded.

2. An overload release clutch comprising a pair of rotary clutch elements, an electromagnet carried by one of said elements, and cooperating means on said elements for holding them against relative rotary movement solely by the magnetic forces exerted thereon by said magnet, said means being characterized when engaged by their being rotatable relative to each other substantially in the direction of the lines of force produced by the magnet to automatically release the clutch.

3. An overload release clutch comprising a pair of rotary clutch elements, an electromagnet associated with said elements, means on said elements for holding them together by the magnetic pull exerted thereon by said magnet, means for automatically separating said elements when one is permitted to rotate relative to the other, and means for energizing said magnet when said elements are in a preselected position.

4. An overload release clutch comprising a pair of clutch heads adapted to be cooperatively mounted on the adjacent ends of a pair of axially aligned shafts, an electromagnet carried by one of said clutch heads, means for energizing said magnet, and an armature face on each of said clutch heads disposed in the magnetic circuit of said magnet to contact each other in a substantially diametrical plane passing through the axes of the clutch heads and operative to prevent relative movement of said heads solely by the pull exerted thereon by the field of the magnet.

5. An overload release clutch comprising a pair of permeable clutch heads adapted to be mounted in opposed relation on the abutting ends of a pair of axially aligned shafts, an electromagnet mounted between said heads in a manner to include them in series relation in its magnetic circuit, means for supplying current to said magnet, an axially extending armature face on each of said heads which comprises means for holding said heads together under the influence of said magnet, means for automatically separating said heads axially when they are rotated relative to one another, and means for connecting said magnet to and disconnecting it from said source of current supply when said heads are in predetermined relative positions.

6. An overload release clutch comprising a pair of clutch heads adapted to be cooperatively mounted on the ends of a pair of axially aligned shafts for connecting them together, an electromagnet mounted between said heads in a manner to include them in its magnetic circuit, a source of current supply for said magnet, a pair of cooperating armature faces on said heads disposed to hold said heads together by the pull exerted thereon by said magnet, means for connecting said magnet to and disconnecting it from said source of current supply when said heads are in predetermined relative positions, and means for varying the intensity of the magnetic field produced by said magnet.

7. An overload release clutch comprising a pair of abutting axially aligned shafts, a pair of clutch heads mounted on said shafts for rotation therewith and one for axial adjustment with respect to the other, an electromagnet mounted between said clutch heads in a manner to include them both in its magnetic circuit, opposed armature surfaces on said heads lying in planes passing through the axes of said shafts and adapted to contact each other when the heads are in operative engagement, means for energizing said magnet when said heads are in operative engagement thereby providing a magnetic field for holding the heads together through the pull thereby exerted upon said opposed armature surfaces, and means for automatically moving one of said heads out of the path of the other when relative rotary movement occurs between them.

8. An overload release clutch comprising a pair of abutting axially aligned shafts, a pair of clutch heads mounted on said shafts for rotation therewith and one for axial adjustment with respect to the other, an electromagnet mounted on one of said shafts between said clutch heads with said latter shaft and both of said heads included in its magnetic circuit, a plurality of armature faces lying in planes passing through the axes of said shafts provided on each of said heads with those on the one head opposed to those on the other and disposed to be attracted by the magnetic forces developed by said magnet, means for energizing said magnet when said clutch heads are in their operative positions and for deenergizing it when one of said heads is moved relative to the other, and means for automatically moving said heads apart when one is rotated relative to the other.

9. An overload release clutch comprising a pair of abutting axially aligned shafts, a pair of permeable clutch heads mounted on said shafts for rotation therewith and one for axial adjustment relative to the other, an electromagnet mounted on one of said shafts between said clutch heads in a manner to include them both in its magnetic circuit, a plurality of peripherally spaced axially extending teeth-like projections formed on each of said heads, each of said projections on the one head being arranged in opposed relation to the projections on the other head and each provided at one side with an armature face lying in a plane passing through the axes of said shafts and on the other side with a cam face lying in a plane at an angle to the diameter of the shafts, said armature faces on the one head being adapted to contact the armature faces on the other when the clutch is engaged and the cam faces on the one being adapted to cooperate with the cam faces on the other to separate the clutch heads when one of them is rotated in a given direction relative to the other, means for supplying current to said magnet, and means for connecting said magnet to said current supply when said heads are in a predetermined relative position and for disconnecting it therefrom when they depart from the selected position.

10. An overload release clutch comprising a pair of abutting axially aligned shafts, a pair of clutch heads mounted on said shafts for rotation therewith, means for axially moving one of said heads into and out of engagement with the other, an electromagnet mounted between said clutch heads in a manner to include them both in its magnetic circuit, a plurality of peripherally spaced axially extending teeth-like projections formed on each of said heads, said projections on the one head being arranged in opposed relation to the projections on the other head and each provided at one side with an armature face lying in a plane passing substantially through the axes of said shafts and on the other side with a cam surface extending at an angle to the diameter of the shafts, said armature faces on the one head being adapted to contact the armature faces on the other when the clutch is engaged and be held together by the action thereon of the magnetic force developed by said magnet, said cam faces on the one head being adapted to cooperate with the cam faces on the other to separate the clutch heads when the one is rotated relative to the other, means for energizing said magnet when said clutch heads are in operative engagement and for deenergizing when they are out of engagement, and means for varying the strength of the magnetic forces developed by said magnet.

11. An overload release clutch comprising a pair of abutting axially aligned shafts, a pair of clutch heads mounted on said shafts for rotation therewith and at least one for axial adjustment thereon, an electromagnet mounted between said clutch heads in a manner to include them both in its magnetic circuit, a plurality of oppositely disposed armature faces lying in planes passing through the axes of said shafts provided on each of said heads with those on one head arranged to cooperate with those on the other head to hold the clutch heads together when the clutch is engaged, means for automatically moving one of said heads out of the path of the other when one is permitted to rotate relative to the other, a collector ring on one head connected to one end of said electromagnet, a current-supplying brush arranged to contact said collector ring, a variable resistor connected to said brush, a source of current supply connected to said resistor, a second collector ring mounted on the other clutch head, a switch for connecting the other end of the magnet to said latter collector ring when said clutch is engaged and disconnect it when the heads separate, a second current-supplying brush contacting said second ring, and means connecting said latter brush to the other side of said source of current supply.

12. An overload release clutch comprising a pair of abutting axially aligned shafts, a pair of clutch heads mounted on said shafts for rotation therewith and at least one for axial adjustment thereon, an electromagnet mounted between said clutch heads in a manner to include both in its magnetic circuit, a plurality of peripherally spaced axially extending teeth-like projections formed on each of said heads, said projections on the one head being arranged in opposed relation to the corresponding projections on the other head and each provided at one side with an armature face lying in a plane passing through the axes of said shafts and on the other side with a cam face lying in a plane at an angle to the diameter of the shafts, said armature faces on the one head being adapted to contact the armature faces on the other when the clutch is engaged and the cam faces on the one being adapted to cooperate with the cam faces on the other to separate the clutch heads when the one is rotated relative to the other, a collector ring on one head connected to one end of said electromagnet, a stationary brush arranged to contact said collector ring, a variable resistor connected to said brush, a source of current supply having one side connected to said resistor, a second collector ring mounted on the other clutch head, a switch for connecting the other end of the magnet to said latter collector ring when said clutch is engaged, a stationary brush contacting said second ring, and means connecting said latter brush to the other side of said source of current supply.

13. An overload release clutch comprising a pair of clutch heads mounted in axial alignment, an electromagnet carried by one of said clutch heads, means for energizing said magnet, and a substantially diametrically disposed armature face on each of said clutch heads arranged in the magnetic circuit of said magnet and operative to prevent separation of said heads solely by the pull exerted thereon by the field of the magnet.

14. A driving shaft, a driven shaft, a magnetic clutch disposed to drive said driven shaft solely by magnetic pull, and adapted to automatically release itself when the load on the driven shaft exceeds the magnetic pull of said clutch.

15. In combination with a driving shaft and a driven shaft, a magnetic clutch comprising a pair of clutch heads mounted on said shafts, an electromagnet mounted on one of said heads and arranged to rotate the other solely by magnetic pull, said magnetic pull being applied in substantially the direction of rotation of said shafts.

16. An overload release clutch comprising a pair of rotary clutch elements, an electromagnet mounted on one of said elements, means on said elements for holding them together solely by the magnetic pull exerted thereon by said magnet, and means for automatically separating said elements axially when one is permitted to rotate relative to the other.

17. An overload release clutch comprising a pair of rotary clutch elements, an electromagnet mounted on one of said elements, means for supplying a source of energizing current to said magnet, means on said elements for holding them together solely by the pull exerted thereon by said magnet, and means determined by the relative positions of said elements for controlling the flow of current to said magnet.

FLORENCE C. BIGGERT, Jr.